United States Patent
Garvey et al.

(10) Patent No.: US 9,051,972 B2
(45) Date of Patent: Jun. 9, 2015

(54) TORQUE-LIMITING COUPLING

(75) Inventors: Seamus Garvey, Nottingham (GB); James Simonds, London (GB)

(73) Assignee: ROLLS-ROYCE PLC, London (GB)

( * ) Notice: Subject to any disclaimer, the term of this patent is extended or adjusted under 35 U.S.C. 154(b) by 130 days.

(21) Appl. No.: 13/980,683

(22) PCT Filed: Jan. 18, 2012

(86) PCT No.: PCT/EP2012/050712
§ 371 (c)(1),
(2), (4) Date: Sep. 16, 2013

(87) PCT Pub. No.: WO2012/101020
PCT Pub. Date: Aug. 2, 2012

(65) Prior Publication Data
US 2014/0011599 A1    Jan. 9, 2014

(30) Foreign Application Priority Data
Jan. 26, 2011 (GB) .................................. 1101321.6

(51) Int. Cl.
*F16D 9/00* (2006.01)
*F16D 7/02* (2006.01)

(52) U.S. Cl.
CPC ........ *F16D 7/024* (2013.01); *F16D 7/02* (2013.01); *F16D 7/028* (2013.01); *F16D 9/00* (2013.01)

(58) Field of Classification Search
CPC ......................................................... F16D 7/024
See application file for complete search history.

(56) References Cited

U.S. PATENT DOCUMENTS 3,220,218 A * 11/1965 Lewis et al. .................. 464/33
4,184,345 A * 1/1980 Cutler ............................ 464/32
2008/0076583 A1    3/2008 Ueda et al.

FOREIGN PATENT DOCUMENTS

SU              759766 A1    8/1980
WO        WO 80/00476 A1    3/1980
WO      WO 2010/061805 A1    6/2010

OTHER PUBLICATIONS

May 7, 2012 Search Report issued in International Patent Application No. PCT/EP2012/050712.

* cited by examiner

*Primary Examiner* — Rodney H Bonck
(74) *Attorney, Agent, or Firm* — Oliff PLC

(57) ABSTRACT

Described herein is a torque-limiting coupling provided for connecting coaxial, first and second rotating shafts. The coupling includes a first connecting part on an end of the first shaft and a second connecting part on an end of the second shaft. An interconnector joins to the first connecting part at a first engagement formation, and joins to the second connecting part at a second engagement formation. The first engagement formation threadingly joins the interconnector to the first connecting part. The second engagement formation can resist rotational movement of the interconnector relative to the second connecting part but allows movement of the interconnector in the axial direction of the shafts. When a torque transmitted by the shafts exceeds a predetermined value, the interconnector rotates relative to the first connecting part at the threaded engagement formation. The resistance to rotational movement relative to the second connecting part causes the interconnector to move in an axial direction of the shafts, and come out of engagement with the first and/or the second connecting part.

8 Claims, 4 Drawing Sheets

TORQUE-LIMITING COUPLING

The present invention relates to a torque-limiting coupling for connecting coaxial, first and second rotating shafts.

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 14 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Gas turbine engines such as the engine shown in FIG. 1 typically have an auxiliaries gearbox which is powered by a mechanical take-off from one of the interconnecting shafts, and which in turn provides mechanical power to engine or aircraft auxiliary devices, such as fuel pumps and electrical generators, via rotating drive shafts extending from the gearbox. It is usually desirable, in applications such as this, where mechanical power is transmitted through a rotating shaft, to limit the amount of torque that may be transmitted through that shaft. Limiting the amount of torque allows the integrity of the gearbox to be preserved, even if one or more of the auxiliary devices discontinue their functions.

A conventional approach to providing such torque limitation is to provide the rotating shaft with a "shear-neck" which will rupture when the transmitted torque exceeds a given value. A shear-neck can be configured to fail dependably within a small range of torques, as it is undesirable that the neck should fail at too low a torque and equally undesirable that it should sustain too high a torque before failing.

In many applications, shear-necks are a robust and inexpensive solution to the problem of providing a torque limit. However, shear-necks tend to release torque suddenly. This is because they are generally made from hard materials, ductile materials tending to work-harden and therefore producing unreliable failure torques. In some applications, the torque released suddenly by one shear-neck can cause failures elsewhere in a system.

Thus an aim of the present invention is to provide a torque-limiting coupling which can be configured to activate dependably within a small range of torques, but which releases the torque in a more gradual manner.

Accordingly, a first aspect of the invention provides a torque-limiting coupling for connecting coaxial, first and second rotating shafts, the coupling comprising:

a first connecting part on an end of the first shaft,
a second connecting part on an end of the second shaft, and
an interconnector which joins to the first connecting part at a first engagement formation, and which joins to the second connecting part at a second engagement formation;

wherein the first engagement formation is a threaded engagement formation which threadingly joins the interconnector to the first connecting part, and the second engagement formation is configured to resist rotational movement of the interconnector relative to the second connecting part, but to allow movement of the interconnector in the axial direction of the shafts;

whereby, when a torque transmitted by the shafts exceeds a predetermined value, the interconnector rotates relative to the first connecting part at the threaded engagement formation, the resistance to rotational movement relative to the second connecting part causing the interconnector to move in an axial direction of the shafts and come out of engagement with the first and/or the second connecting part.

Advantageously, the torque transmitted by the coupling gradually reduces as the interconnector moves in an axial direction of the shafts and comes out of engagement with the first and/or the second connecting part. That is, the transmitted torque typically only falls to zero when engagement is completely lost, which happens over a significantly longer timescale than the rupture of a shear-neck.

The coupling may have any one or, to the extent that they are compatible, any combination of the following optional features.

Conveniently, one of the first and the second connecting parts can be a cup, and the other of the first and the second connecting parts can be a head which locates in the cup, the interconnector being a sleeve occupying an annular space between the head and the cup.

Typically, the second engagement formation is a spline and groove formation in which one or more axially extending splines locate in corresponding axially extending grooves.

Preferably, the first and second connector parts have respective abutment surfaces at which the connector parts abut, and which are configured to prevent the shafts from moving axially relative to each other when the torque transmitted by the shafts exceeds the predetermined value. In this way, the exertion of large axial forces on e.g. bearings connected to the shafts can be prevented when the torque-limiting coupling is activated. For example, the abutment surfaces can be formed on the axis of the shafts and configured such that substantially no torque is transmitted across the abutment surfaces.

In one option, the interconnector can move in only one axial direction of the shafts to come out of engagement with the first and/or the second connecting part, whereby the torque is limited in only one turning direction.

Alternatively, in a second option, the interconnector can move in both axial directions of the shafts to come out of engagement with the first and/or the second connecting part, whereby the torque is limited in both turning directions.

Preferably, the interconnector is configured to be elastically deformed when joined to the first connecting part and the second connecting part, the elastic deformation exerting a predetermined radial pressure on the threaded engagement formation. In this way, the torque needed to overcome frictional resistance and rotate the interconnector relative to the first connector at the threaded engagement formation can be made deterministic, such that the pre-determined limiting value of torque transmitted by the shafts is within a narrow, predictable range. A deterministic frictional resistance can also promoted by having a well-defined coefficient of friction at the thread interfaces of the threaded engagement formation, the coefficient of friction being substantially invariant over the range of operating conditions of the coupling. For example, the first and/or the second engagement formation may be coated with a waxy material at its engagement interface, the waxy material melting at temperatures well above the maximum intended operating temperature of the coupling.

A second aspect of the invention provides the combination of a first shaft and a second shaft connected at respective ends thereof by a torque-limiting coupling according to the first aspect.

A third aspect of the invention provides an auxiliaries gearbox of an aeroengine, the gearbox having one or more drive shafts extending therefrom for driving auxiliary devices, the or each drive shaft being fitted with a respective torque-limiting coupling according to the first aspect for limiting the torque transmitted by the drive shaft Embodiments of the invention will now be described by way of example with reference to the accompanying drawings in which.

Figure 1:
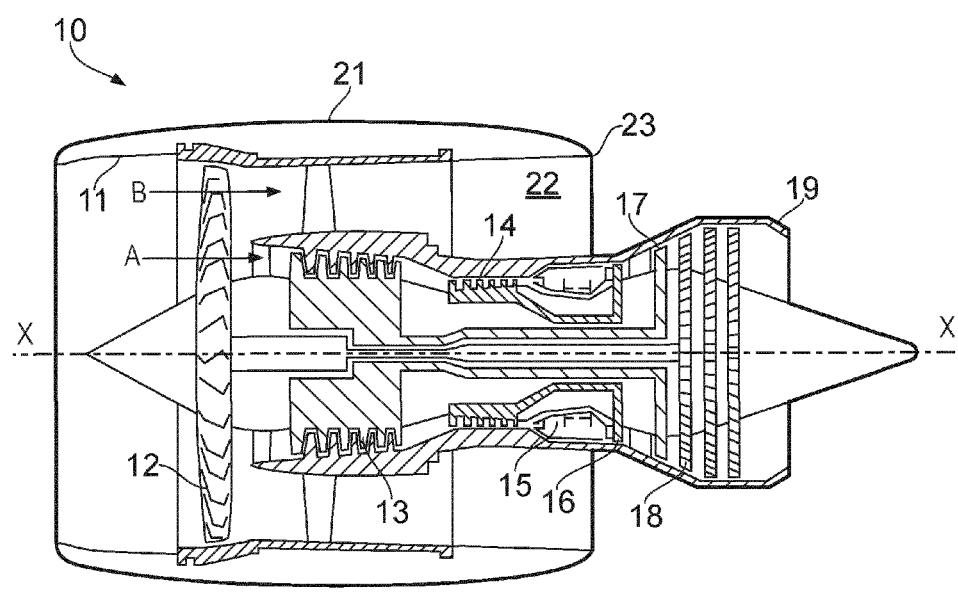
FIG. 1 shows schematically a longitudinal section through a ducted fan gas turbine engine.
Figure 2:
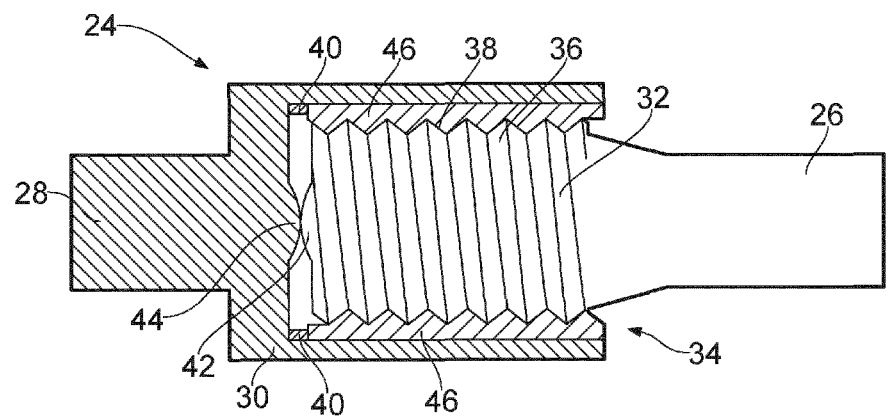
FIG. 2 shows schematically a longitudinal section through a torque-limiting coupling of the present invention.

Referring to FIG. 2, a torque-limiting coupling of the present invention is indicated generally at 24, and connects, coaxial first 26 and second 28 shafts. The first and second shafts have a torque rating higher than the maximum expected torque in the connection, to prevent fracture of the shafts at a torque lower than a pre-determined limiting torque of the torque-limiting coupling. The first shaft connects to equipment which is expected to stop rotating when a very high torque arises. For example, in the case of a generator connected to an auxiliaries gearbox of an aeroengine, the first shaft connects to the generator, and the second shaft connects to the auxiliaries gearbox. The first shaft ends in a head 32 (first connecting part), and the second shaft ends in a cup 30 (second connecting part) with the head locating in the cup.

A sleeve 34 (interconnector) occupies an annular space between the cup and the head. A thread 36 is formed on the outer surface of the head 32, and a corresponding mating thread 38 is formed on the inner surface of the sleeve. The two threads engage to form a first (threaded) engagement formation which joins the sleeve to the head. The cup 30 has grooves 40 extending axially along its inner surface, and corresponding splines 46 axially extend along the outer surface of the sleeve. The splines locate in the grooves to form a second engagement formation joining the sleeve and the cup. The number of splines and grooves can be varied to meet the requirements of the system. Further, the splines can be on the cup and the grooves formed in the sleeve. Indeed, in an alternative embodiment, a thread could be formed on the surface of the cup and a mating thread formed on the outer surface of the sleeve to form the first (threaded) engagement formation, and the second engagement formation can be formed between the sleeve and the head.

Figure 3:
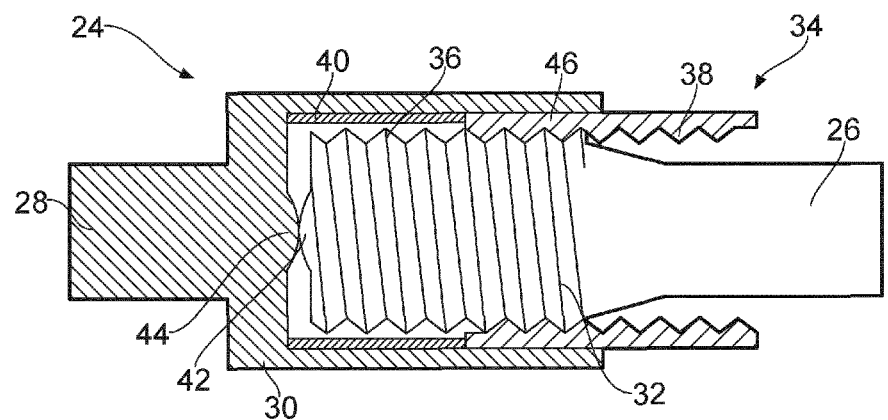
FIG. 3 shows schematically a longitudinal section through the torque-limiting coupling of FIG. 2 when the torque transmitted through connecting shafts has exceeded a pre-determined value.
Figure 4:
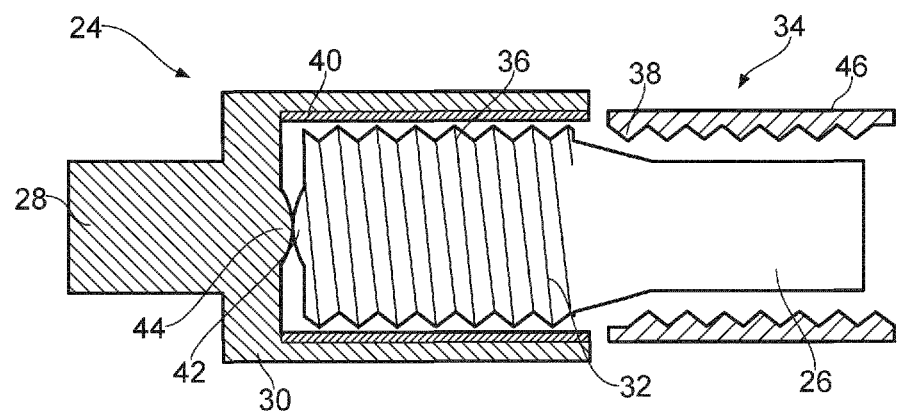
FIG. 4 shows schematically a longitudinal section through the torque-limiting coupling of FIGS. 2 and 3 when the coupling is fully activated.

When a torque transmitted by the shafts 26 and 28 exceeds a predetermined value, the frictional resistance to relative rotation at the threaded engagement formation is overcome and the sleeve 34 rotates relative to the head 32. The groove and spline engagement of the sleeve and cup resists relative rotational movement of the sleeve and the cup but permits axial movement of the sleeve relative to the cup. Thus, the sleeve moves in an axial direction along the first shaft 26 away from the second shaft 28, as illustrated by movement to the right in FIG. 3. The resistance to relative rotation at the threaded engagement formation reduces as the sleeve moves in the axial direction and the threads 36 and 38 disengage. Therefore the maximum transmittable torque reduces substantially linearly with the axial movement of the sleeve. The torque transmitted by the coupling falls to zero when the sleeve loses engagement with either or both of the head and the cup (illustrated in FIG. 4). Advantageously, this reduction in torque transmission happens over a significantly longer timescale than the rupture of a shear-neck.

The coupling can be configured so that the disengaged sleeve 34 remains attached to one or other of the shafts 26, 28. In this way, the disengaged sleeve can be prevented from causing damage to components and/or unbalancing the shafts.

The head terminates in a bull-nose 42 that abuts an opposing bull-nose 44 on the base of the cup. These abutment surfaces prevent the first shaft 26 from moving axially towards the second shaft 28 when the torque transmitted by the shafts exceeds the predetermined value, i.e. the sleeve 34, rather than the first shaft, has to move axially relative to the second shaft. In this way, the combined axial length of the shafts is not substantially altered by the activation of the coupling, preventing the exertion of axial forces on e.g. support bearings to the shafts. In an alternative embodiment, one of the bull-noses may be replaced by a concave hollow of greater radius than the other bull-nose, the remaining bull-nose nesting in the hollow to improve lateral stability. Advantageously, the contact between the abutment surfaces is made on the axis of the first and second shafts, with contact pressure across the surfaces dropping off rapidly with radial distance from the axis. In this way, little or no torque is transmitted across the abutment surfaces.

Figure 5:
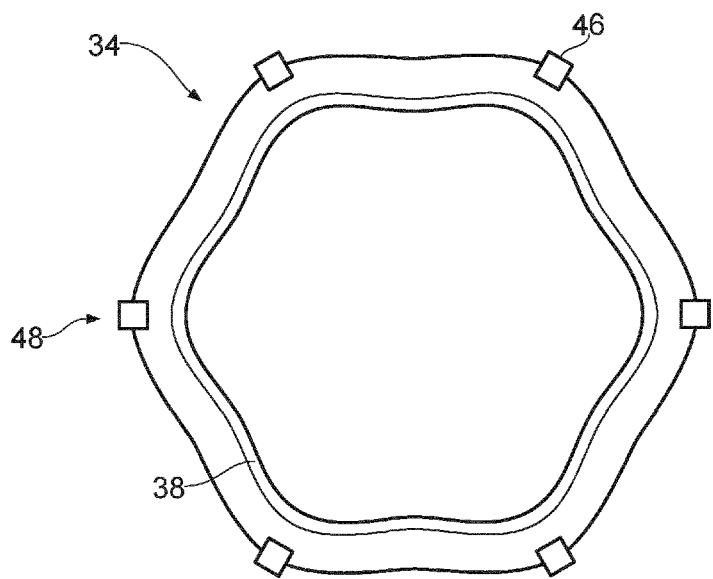
FIG. 5 shows schematically a transverse cross-section through an unconstrained sleeve of the torque-limiting coupling of FIGS. 2 to 4.

FIG. 5 shows schematically a cross-section of the unconstrained sleeve (indicated generally at 34), i.e. when not engaged with the head 32 and the cup 30. Rather than having a circular cross-section, the unconstrained sleeve has a six "lobed" cross-sectional shape, each lobe carrying a respective spline 46. The lobes are forced radially inwards when sleeve is inserted into the cup, producing an elastic deformation of the sleeve which enables a pre-determined radial pressure to be exerted across the threaded engagement formation. The number and/or size of the lobes can be chosen depending on the requirements of the torque-limiting coupling, e.g. in accordance with the required pre-determined radial pressure.

Figure 6:
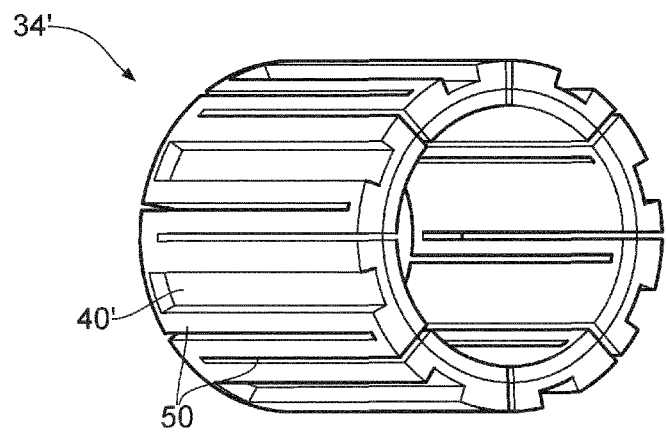
FIG. 6 shows schematically a perspective view through an alternative embodiment of the unconstrained sleeve of the torque-limiting coupling of FIGS. 2 to 4.
Figure 7:
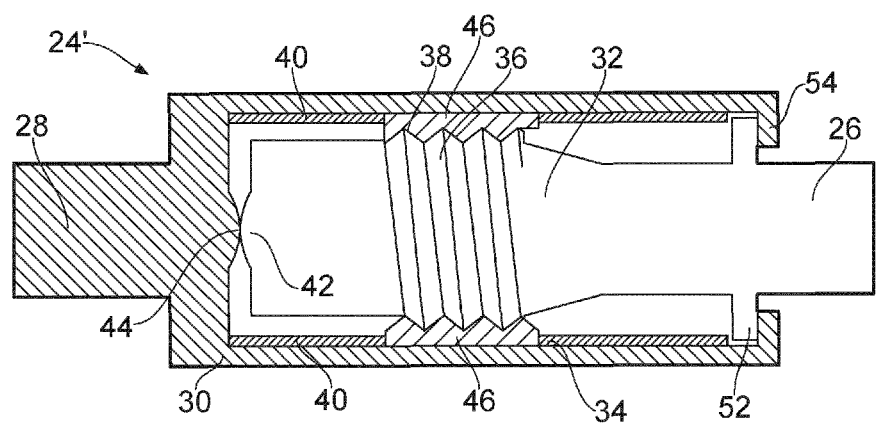
FIG. 7 shows schematically a longitudinal section through a further torque-limiting coupling of the present invention.

FIG. 6 shows schematically a perspective view of an alternative embodiment of the unconstrained sleeve (indicated generally at 34'). In this embodiment, the sleeve has axially extending grooves 40' along its outer surface which fit into corresponding splines (not shown) axially extending along the inner surface of the cup to form the second engagement formation. Further, to cause a pre-determined radial pressure to be exerted across the threaded (first) engagement formation at the inner surface of the sleeve (the threads on the inner surface of the sleeve are not shown in FIG. 6), the sleeve has axially extending slits 50 between the grooves, which allow the sleeve to be compressed in the manner of a collet.

Preferably the surfaces of the head 32 and the sleeve 34 at threads 36 and 38 are configured to provide a well-defined coefficient of friction at the thread interfaces. For example, the threads can be coated with a wax that melts at temperatures well above the maximum intended operating temperature of the torque-limiting coupling. Such an approach means that the coefficient of friction can be substantially invariant across the operating conditions of the coupling.

The frictional resistance to rotation of the sleeve 34 relative to the head 32 is largely determined by: (i) the radial pressure exerted across the threaded engagement formation, (ii) the area of that formation, and (iii) the coefficient of friction at the thread interfaces. When (i) to (iii) are well-defined, the level of torque at which the coupling activates (i.e. the predetermined torque value) can also be well-defined, leading to safe and reliable operation of the coupling. Further, any of (i) to (iii) can be modified (e.g. varying the radial pressure by changing the number or size of the lobes 48) to change the predetermined torque value.

FIG. 6 shows schematically a longitudinal section through a further torque-limiting coupling 24' of the present invention. The coupling has features in common with the coupling of FIGS. 2 to 5, similar or identical features having the same reference numbers in the two couplings. Thus the coupling 24' connects coaxial first 26 and second 28 shafts. When a torque transmitted by the shafts 26 and 28 exceeds a predetermined value in one turning direction, the frictional resistance to relative rotation at the threaded engagement formation is overcome and the sleeve 34 rotates relative to the head 32, moving to the right in the drawing of FIG. 6 as the threads 36 and 38 disengage. The abutting bull-noses 42, 44 prevent the first shaft 26 from moving axially towards the second shaft 28.

However, the coupling 24' also has features which allow it to limit torque in the other turning direction as well. More particularly, the sleeve 34 is spaced from the base of the cup so that when the predetermined torque is exceeded in the other turning direction, the sleeve can move to the left in the drawing of FIG. 6 until the threads 36 and 38 disengage. Further, the head 32 has an outwardly projecting stop 52 on the opposite side of the threads 36 to the bullnose 42, the stop resting against an opposing stop 54 which projects inwardly from the cup 30. The stops contact at respective abutment surfaces which prevent the first shaft 26 from moving axially away from the second shaft 28 when the torque transmitted by the shafts exceeds the predetermined value in the other turning direction. The stops can be configured, e.g. by the application of lubrication or low friction surface coatings at their abutment surfaces, or by the provision of a low turning resistance mechanical bearing such that they do not transmit significant amounts of torque.

While the exemplary invention has been described in conjunction with the exemplary embodiments described above, many equivalent modifications and variations will be apparent to those skilled in the art when given this disclosure. For example, although the torque-limiting coupling has been described with reference to an auxiliaries gearbox of an aeroengine, there are many other applications (aero and non-aero) where such a coupling could be applied. Accordingly, the exemplary embodiments of the invention set forth above are considered to be illustrative and not limiting. Various changes to the described embodiments may be made without departing from the spirit and scope of the invention.

The invention claimed is:

1. A torque-limiting coupling for connecting coaxial, first and second rotating shafts, the coupling comprising:
   a first connecting part on an end of the first shaft,
   a second connecting part on an end of the second shaft, and
   an interconnector which joins to the first connecting part at a first engagement formation, and which joins to the second connecting part at a second engagement formation;
   wherein the first engagement formation is a threaded engagement formation which threadingly joins the interconnector to the first connecting part, and the second engagement formation is configured to resist rotational movement of the interconnector relative to the second connecting part, but to allow movement of the interconnector in the axial direction of the shafts, wherein the interconnector is configured to be elastically deformed when joined to the first connecting part and the second connecting part, the elastic deformation exerting a predetermined radial pressure on the threaded engagement formation;
   whereby, when a torque transmitted by the shafts exceeds a predetermined value, the interconnector rotates relative to the first connecting part at the threaded engagement formation, the resistance to rotational movement relative to the second connecting part causing the interconnector to move in an axial direction of the shafts and come out of engagement with the first and/or the second connecting part.

2. A torque-limiting coupling according to claim 1, wherein one of the first and the second connecting parts is a cup and the other of the first and the second connecting parts is a head which locates in the cup, the interconnector being a sleeve occupying an annular space between the head and the cup.

3. A torque-limiting coupling according to claim 1, wherein the second engagement formation is a spline and groove formation in which one or more axially extending splines locate in corresponding axially extending grooves.

4. A torque-limiting coupling according to claim 1, wherein the first and second connector parts have respective abutment surfaces at which the connector parts abut, and which are configured to prevent the shafts from moving axially relative to each other when the torque transmitted by the shafts exceeds the predetermined value.

5. A torque-limiting coupling according to claim 1, wherein the interconnector can move in only one axial direction of the shafts to come out of engagement with the first and/or the second connecting part, whereby the torque is limited in only one turning direction.

6. A torque-limiting coupling according to claim 1, wherein the interconnector can move in both axial directions of the shafts to come out of engagement with the first and/or the second connecting part, whereby the torque is limited in both turning directions.

7. The combination of a first shaft and a second shaft connected at respective ends thereof by a torque-limiting coupling according to claim 1.

8. An auxiliaries gearbox of an aeroengine, the gearbox having one or more drive shafts extending therefrom for driving auxiliary devices, the or each drive shaft being fitted with a respective torque-limiting coupling according to claim 1 for limiting the torque transmitted by the drive shaft.

\* \* \* \* \*